United States Patent [19]

Brown et al.

[11] 4,358,475
[45] Nov. 9, 1982

[54] METHOD OF PREPARING ACTIVE ELECTRODES

[75] Inventors: David E. Brown, Weybridge; Mahmood N. Mahmood, Walton-on-Thames, both of England

[73] Assignee: The British Petroleum Company Limited, London, England

[21] Appl. No.: 242,458

[22] Filed: Mar. 11, 1981

Related U.S. Application Data

[63] Continuation of Ser. No. 73,709, Sep. 10, 1979, abandoned.

[30] Foreign Application Priority Data

Sep. 21, 1978 [GB] United Kingdom ............... 37556/78

[51] Int. Cl.$^3$ .............................................. B05D 5/12
[52] U.S. Cl. .................................... 427/34; 427/126.3; 427/126.6; 427/226; 427/377; 427/423; 427/123; 204/290 R; 204/290 F
[58] Field of Search ................. 427/126.3, 126.6, 377, 427/34, 423, 123, 226; 204/290 R, 290 F; 252/470

[56] References Cited

U.S. PATENT DOCUMENTS

| | | | |
|---|---|---|---|
| 3,455,724 | 7/1969 | Teeg et al. | 427/377 |
| 3,759,842 | 9/1973 | Bianchi et al. | 204/98 |
| 3,843,562 | 10/1974 | Friedrich et al. | 252/470 |
| 3,846,341 | 11/1974 | Courty | 252/470 |
| 3,873,470 | 3/1975 | Conway et al. | 252/470 |
| 4,042,420 | 8/1977 | Nishino et al. | 427/126.3 |
| 4,072,586 | 2/1978 | De Nora et al. | 204/290 R |
| 4,080,278 | 3/1978 | Ravier et al. | 204/290 R |
| 4,142,005 | 2/1979 | Caldwell et al. | 204/290 F |
| 4,146,446 | 3/1979 | von Sturm | 204/290 R |
| 4,256,545 | 3/1981 | Deborski | 427/126.3 |

OTHER PUBLICATIONS

Appleby et al. Proc. of Symposium on Industrial Water Electrolysis, Proc. vol. 78, Electrochem. Soc., 1978, pp. 150–161.

Primary Examiner—John D. Smith
Assistant Examiner—Richard Bueker
Attorney, Agent, or Firm—Brooks, Haidt, Haffner & Delahunty

[57] ABSTRACT

This invention relates to a method of producing metal electrodes by treating a metal electrode substrate so as to coat the substrate surface with a homogeneous solution of the compounds of (i) at least one metal selected from a first group of iron, cobalt, nickel and manganese (ii) at least one other metal selected from a second group of molybdenum, tungsten and vanadium, each of which compound is capable of thermal decomposition to the corresponding metal oxide. The coated substrate is then thermally decomposed and the oxide-coated substrate is cured in a reducing atmosphere at elevated temperature. Substrates coated with Ni-Mo oxides are preferred. The electrodes thus produced exhibit very low overvoltage, are of high stability with respect to their activity and can be used as cathodes for the electrolysis of water or brine.

11 Claims, 2 Drawing Figures

POLARISATION CURVE.
Catalyst on 80 mesh Nickel Substrate.
Conditions 30% w/w KOH 70°C.
voltages v RHE.
Electrode Example 1.2.

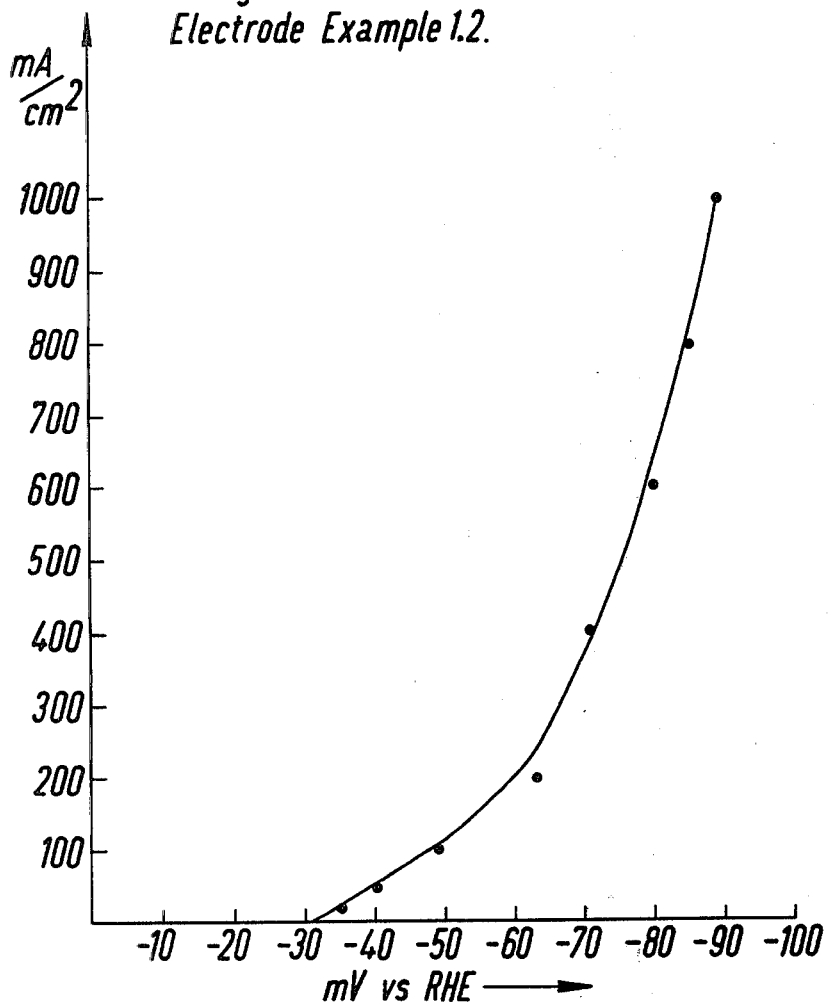

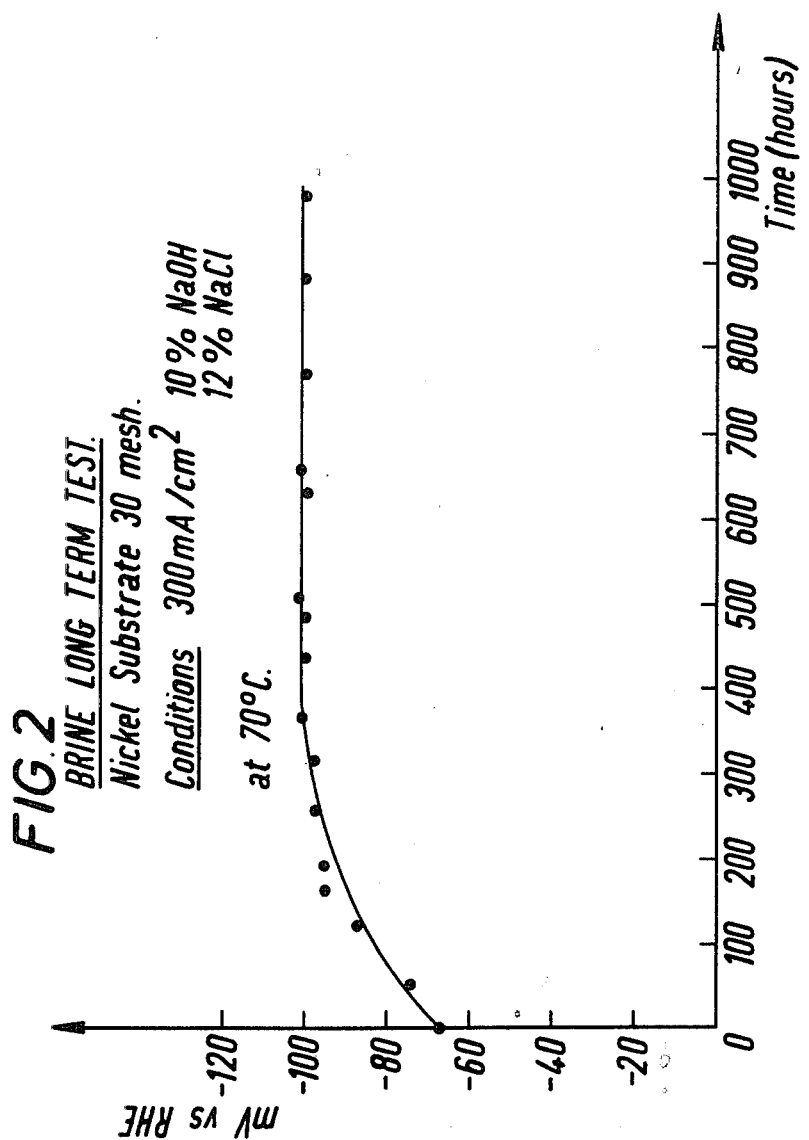

METHOD OF PREPARING ACTIVE ELECTRODES

The application is a continuation of application Ser. No. 073,709 filed on Sept. 10th, 1979, now abandoned.

The present invention relates to a method of preparing active electrodes and in particular to such electrodes having improved efficiency and/or stability and the use thereof in electrochemical cells.

An electrochemical cell is a device which has as basic components at least one anode and one cathode and an electrolyte. The cell may use electrical energy to achieve a chemical reaction such as the oxidation or reduction of a chemical compound as in an electrolytic cell. Alternatively, it can convert inherent chemical energy in a conventional fuel into low voltage direct current electrical energy as in a fuel cell. The electrodes, particularly the cathode, in such a cell may be of relatively inexpensive material such as iron or nickel. However, electrodes of such material tend to have low activity. These problems may be overcome to a degree by using electrodes made with active precious metals such as platinum. These precious metals may be used as catalytic coatings on the surface of an electrode core of inexpensive material. Such catalyst coatings are termed electrocatalysts. The level of precious metal required for high activity and stability generally leads to high costs.

The above problems are particularly acute in electrochemical cells having a hydrogen electrode. Such electrochemical cells are used for several purposes such as, for example, the electrolysis of water to produce hydrogen and oxygen, in chlorine cells in which brine is electrolysed and in fuel cells which generate power by the oxidation of hydrogen. Of these processes, the electrolysis of water is used on an industrial scale for producing high purity hydrogen.

In the case of the production of hydrogen and oxygen by the electrolysis of water, water is decomposed into its elements when a current, eg a direct current, is passed between a pair of electrodes immersed in a suitable aqueous electrolyte. In order to obtain the gases evolved in a pure and safe condition, an ion-permeable membrane or diaphragm is placed between the electrodes to prevent the gases mixing. The basic elements of this cell are thus two electrodes, a diaphragm and a suitable electrolyte which is preferably an alkaline electrolyte such as an aqueous solution of sodium hydroxide or potassium hydroxide due to their high conductivity and relatively low corrosivity.

In this case, the voltage, V, applied across the electrodes can be divided into three components, the decomposition voltage of water, $E_d$, the overvoltage at the electrodes, $E_o$, and the Ohmic loss in the inter-electrode gap which is the product of the cell current, I, and the electrical resistance (including the membrane resistance) of this gap, R.

Thus $V = E_d + E_o + IR$.

At 25° C. and at a pressure of one atmosphere, the reversible decomposition voltage of water is 1.23 V. However, in practice cells operate at voltages of 1.8 to 2.2 V, as a result, inter alia, of activation overvoltage.

Activation overvoltage results from the slowness of the reactions at the electrode surface and varies with the metal of the electrode and its surface condition. It may be reduced by operating at elevated temperatures and/or by using improved electrocatalysts, but increases with the current density of the electrode reaction. The use of cathodes containing precious metal electrocatalysts such as platinum, for example, does achieve a reduction in activation overvoltage. However, the technical advantage to be obtained by the use of such precious metal electrocatalysts is substantially offset by the expense. The use of mixed cobalt/molybdenum oxide as electrocatalyst has also been suggested. Such an electrode can be made by painting a nickel gauze with a mixed cobalt/molybdenum oxide electrocatalyst bonded with polytetrafluoroethylene (PTFE) followed by curing under hydrogen at 300° C. for 2 hours, which initially has an electrode potential, versus a reversible hydrogen electrode (RHE), of $-182$ mV at a current of 1000 mA/cm$^2$ and 70° C. The curing temperature is normally maintained at or below 300° C. to prevent any excessive sintering of the PTFE bonding which would result in loss of activity. The activity of this electrode also decreases substantially when left immersed in an alkaline solution on open circuit when no current is passed through the cell for a long time, as for example during a shut-down in industrial application. The electrode potential then rises to $-300$ mV versus RHE as a reference, at the same current density and temperature. This loss of activity and efficiency has hitherto prevented mixed cobalt/molybdenum oxide being considered as an alternative to precious metal electrocatalysts. The stability of electrodes produced by the above techniques has been improved by the addition of stabilising agents to the electrolyte to maintain their activity over a period of time.

It is an object of the present invention to produce active and stable electrodes which can be used in electrochemical cells.

It has now been found that the activity of these cheaper alternative electrocatalysts can be substantially improved by modifying the method of preparing the electrode coated with these electrocatalysts which not only results in electrodes of relatively higher activity and stability but also obviates the need to add stabilizing agents.

Accordingly, the present invention is a method of producing electrodes having electrocatalysts deposited thereon comprising treating a metal electrode substrate so as to coat the substrate surface with a homogeneous solution of a plurality of metal compounds capable of thermal decomposition to the corresponding metal oxides, thermally decomposing the metal compounds on the substrate to the corresponding oxides or mixed oxides and curing the oxide coated substrate in a reducing atmosphere at elevated temperature.

According to another embodiment, the present invention is a method of producing electrodes having electrocatalysts deposited thereon comprising treating a metal electrode substrate so as to coat the substrate surface with a homogeneous solution of the compounds of (i) at least one metal selected from a first group of iron, cobalt, nickel and manganese, and (ii) at least one other metal selected from a second group of molybdenum, tungsten and vanadium, each of which compound is capable of thermal decomposition to the corresponding metal oxide, thermally decomposing the metal compounds on the substrate to the corresponding oxides or mixed oxides and curing the oxide-coated substrate in a reducing atmosphere at elevated temperature.

According to a more specific embodiment the present invention is a method of producing electrodes having electrocatalysts deposited thereon comprising treating a metal electrode substrate so as to coat the substrate surface with a homogeneous solution as hereinafter defined of a nickel compound and a molybdenum compound both of which are capable of thermal decomposition to the corresponding oxides or mixed oxides, thermally decomposing the metal compounds on the substrate surface to the corresponding oxides or mixed oxides, and curing the oxide-coated substrate in a reducing atmosphere at elevated temperature.

The term "homogeneous solution" as used here and throughout the specification is meant to embrace both liquid homogeneous solutions and homogeneous solids.

Thus, the metal electrode substrate on which the coating is carried out according to the present invention may be of a relatively inexpensive material such as for instance nickel, iron, copper, titanium, and alloys thereof or of other metallic substances plated with any of these materials. The substrate may be in the form of wire, tube, rod, planar or curved sheet, screen or gauze. A nickel screen or nickel plated iron substrate is preferred.

The plurality of metals of which compounds are present in the homogeneous solution are suitably compounds of (i) at least one metal selected from a first group of iron, cobalt, nickel and manganese, and (ii) at least one other metal selected from a second group of molybdenum, vanadium and tungsten. Each of the compounds present in the solution should be capable of thermal decomposition to the corresponding oxide. Examples of compounds which maybe used include the nitrates and chlorides of the metals particularly those in the first group and, specifically for those in the second group, the molybdates, tungstates, vanadates, such as, e.g. ammonium paramolybdate, ammonium tungstate and ammonium metavandate. If a technique is used which enables the direct spraying of the metal oxides the metal compounds in such a case are the oxides. The ratio of the respective compounds in the homogeneous solution may be conveniently defined as the atom percent of the metal(s) in the second group in relation to that of the total metal atoms from both groups in the solution. On this basis the atom % of the metal(s) of the second group in the homogeneous solution is suitably above 5, preferably above 10 and most preferably above 20.

The homogeneous solution of the metal compounds used for coating may be an intimate mixture of the respective solid metal compounds in their finely divided state, a solid solution of the metal compounds or a solution of the compounds in a solvent. An intimate mixture of the solid metal compounds may be premixed or mixed immediately prior to contact with the substrate to be coated. An example of the latter is the case when the respective metal compounds are sprayed separately but simultaneously on to the substrate; if premixed, the mixture may for example be sprayed from a single spray gun. Where they are solutions in solvents, the solvent may be aqueous such as for example water, acidic or alkaline systems or aqueous ethanol, or organic solvents, e.g. methanol, ethanol, propanol, isopropanol, formamide or dimethyl formamide. The choice of a particular solvent will depend upon the solubility of the desired metal compounds in the solvent.

In certain cases where aqueous systems are used, there may be a tendency for one or more of the metal compounds to separate by precipation, particularly on standing the solution even for a relatively short time. For example an aqueous solution containing nickel nitrate and ammonium molybdate tends to precipitate a compound on standing. In this case the solution is no longer a homogeneous mixture of the recommended concentration and may therefore give unsatisfactory results. We have found that this precipitation may be avoided, especially in the case of nickel/molybdenum systems by adding ammonia to the solution so as to bring the pH of the solution to about 9.

If the homogeneous solution is a liquid it may be applied to the substrate surface to be coated for example by dipping, spraying, brushing or by plating from a homogeneous solution. The coated substrate is thereafter heated at elevated temperature to decompose the metal compounds into the corresponding oxides. The decomposition is suitably carried out in air at a temperature between 250° and 1200° C., preferably between 300° and 950° C. The operation of applying a coat of the homogeneous solution to the substrate followed by thermal decomposition may be repeated several times to ensure adequate coverage of the substrate surface with the metal oxides.

If, on the other hand, the homogeneous solution of the metal compounds is a mixture of solids, whether or not premixed, it may be applied to the substrate by melt spraying techniques such as for example flame spraying or plasma spraying. If this type of technique is used, the steps of coating the substrates with the metal compounds and thermal decomposition of the coating are both effected in a single step. This is due to the relatively high temperature associated with such techniques whereby the metal compounds may be expected to decompose to their oxides.

The substrate coated with the metal oxides, whether from a homogeneous liquid or a mixture of solids, is then cured by heating in an oven in a reducing atmosphere at a temperature between 250° and 700° C. The reducing atmosphere is preferably hydrogen and the heating temperature is preferably between 350° and 600° C. Some variation in the optimum curing temperature may be achieved by varying the duration of the curing treatment.

By carrying out the process of the present invention the electrodes produced have a surprisingly high degree of activity and stability. The exact nature of the active species forming the electrocatalyst is not clear. It would appear that apart from the metal oxides present on the substrate surface, the final curing step in a reducing atmosphere also converts at least some of the oxides to a metallic state.

The steps of electrode preparation may be adapted to produce an appropriate level of catalyst loading on the substrate surface. The catalyst loading is suitably above 5 mg/cm$^2$ (based on the weight of the active species deposited on the substrate surface), preferably above 10 mg/cm$^2$. The eventual loading will depend upon the mechanical stability and integrity of the coating required, the substrate used and the cell in which the electrode is to be used. It has however been found that by using a method of electrode preparation according to the present invention very low electrode potentials of the order of $-70$ mV vs RHE using a current density of 1 Amp/cm$^2$ at 70° C. in 30% KOH solution may be achieved. This degree of reduction in electrode potential will not only enable operation of the cells at high current density but will also significantly increase the economic efficiency of such cells.

FIG. 1 is a polarization curve showing the effect of current density on electrode potential on the electrode prepared as described in Example 1.2.

FIG. 2 is a curve showing the activity of a nickel-molybdenum electrocatalyst prepared as shown in Example 4 during long term electrolysis in a brine-caustic environment.

The invention is further illustrated with reference to the following examples.

EXAMPLE 1

1.1 Preparation of Homogeneous Solutions Used in Electrode Preparation

Solutions containing known atomic ratios of molybdenum/nickel were prepared by mixing measured volumes of an aqueous solution of nickel nitrate hexahydrate (analar grade) containing 2 gm atoms of Ni and an aqueous solution of ammonium molybdate tetrahydrate (analar grade) containing 1 gm atom of molybdenum. The resulting homogeneous solution had a pH value less than 5. These solutions will hereafter be referred to as solution "A".

The pH value of solution A was raised to about 9 by addition of concentrated aqueous ammonia. The resulting ammoniacal solution will hereafter be referred to as solution B. Solution B was a clear, dark blue solution.

1.2 Preparation of Electrodes—Coating, Thermal Decomposition & Curing.

A clean weight nickel screen (substrate) was dipped in the homogeneous solution B (except when otherwise stated) and was then heated in air in a bunsen flame to red heat (700°–900° C.). The operation was repeated several times until a visibly satisfactory film of the metal oxides was formed on the nickel screen substrate. The oxide-coated nickel screen was then heated in a furnace under a reducing atmosphere of hydrogen at a range of temperatures between 300° C. and 600° C. as shown in Table 1.

1.3 Electrochemical Measurements

The activity of five electrodes produced as in Example 1.2 at various temperatures of curing was checked galvanostatically in a standard three compartment cell. Nickel screen served as the anode and Dynamic Hydrogen Electrode (DHE) or the Saturated Calomel Electrode (SCE) were used as the reference electrodes. The electrolyte used was 30% w/v aqueous potassium hydroxide solution without any additives.

(a) Effect of Curing Temperature on Activity

The cathode potentials achieved vs Reversible Hydrogen Electrode (RHE) when a current of 1 Amp/cm$^2$ was passed at 70° C. after IR correction was taken as a measure of the activity of the electrodes and the results are summarised in Table 1 below.

TABLE 1

| Electrode No | Curing Temperature °C. | Electrode Potential vs RHE (mV) | Homogeneous Soln. Used | Atom % of Mo in soln. |
|---|---|---|---|---|
| 1 | 300 | −172 | B | 30 |
| 2 | 350 | −85 | B | 30 |
| 3 | 400 | −76 | B | 30 |
| 4 | 500 | −80 | A | 30 |
| 5 | 600 | −84 | B | 40 |

(b) Effect of Second Group Metal content on Activity

In a further series of tests electrodes were prepared as in Example 1.2 above but now varying the second group metal content as shown in Table 2 below. The activity of the resulting electrodes was again checked using the above procedure. The results are summarised in Table 2 below.

TABLE 2

| | Curing Temperature - 500° C. Current Density - 1 Amp/cm$^2$ | |
|---|---|---|
| Electrode No | Atomic % of molybdenum* in solution B used for coating electrode | Electrode potential vs RHE (mV) |
| 6 | 6.2 | −297 |
| 7 | 9 | −200 |
| 8 | 11.8 | −80 |
| 9 | 15 | −86 |
| 10 | 20 | −90 |
| 11 | 30 | −83 |
| 12 | 40 | −89 |

*Based on commercial Analar grade ammonium molybdate tetrahydrate.

(c) Effect of electrocatalyst loading on activity

Electrodes were prepared as in Example 1.2 using ammoniacal solution type B of the metal compounds containing 30 atom % of molybdenum (based on a commercial sample of Analar grade ammonium molybdate tetrahydrate), thus varying the catalyst loading on the electrode. The activity of these electrodes was also tested using the above procedure. The results are summarised in Table 3 below.

TABLE 3

| Curing Temperature - 500° C. | | Current Density - 1 Amp/cm$^2$ |
|---|---|---|
| Electrode No | Catalyst loading mg/cm$^2$ | Electrode Potential vs RHE (mV) |
| 13 | 7.4 | −135 |
| 14 | 15.7 | −108 |
| 15 | 18.9 | −82 |
| 16 | 19.5 | −80 |
| 17 | 27.4 | −80 |
| 18 | 35.8 | −85 |
| 19 | 37 | −80 |
| 20 | 49.5 | −89 |
| 21 | 58.1 | −85 |
| 22 | 78.7 | −76 |

(d) Effect of Current density on electro de potential (Polarisation Curves).

An electrode was prepared using solution A (containing 40 atom % of Mo) as described in Example 1.2 and the potential measured (see Example 1.3) over a range of current. The results are shown in FIG. 1.

1.4. Stability of Electrode

The stability of the activity of the electrodes produced by the process of the present invention was tested. Three criteria were used to demonstrate maintenance of activity (i) Stability to reverse polarity (tested by reversing the current).

(ii) Stability to standing an open circuit.

(iii) Stability during continuous use in a test cell (long term test).

The first two criteria, show the tolerance to conditions of accidental abuse and the third provides evidence that performance can be maintained over extended periods.

(a) An electrode was prepared as before from a type B homogeneous solution containing 30 atom % of molybdenum, and after thermal decomposition was cured in a hydrogen atmosphere at 500° C. This electrode had a catalyst loading of 19.5 mg/cm$^2$. The initial electrode potential of this electrode was −76 mV vs RHE. The electrode was made the cathode in a test cell for 2 hours during which period electrode potential remained at −76 mV vs RHE. The polarity of the test cell was reversed for 30 minutes making the electrode the anode. The polarity was then reversed again so that the electrode became the cathode. After 20 minutes as the cathode for the second time at a current density 1 Amp/cm$^2$ its electrode potential was −70 mV vs RHE. This test demonstrated that the electrode was resistant to the reversal of polarity.

(b) A further electrode was prepared but using a homogeneous solution type B containing 30 atom % molybdenum and a catalyst loading of 37.5 mg/cm$^2$. This was thermally decomposed and cured as before. The resulting electrode had an initial electrode potential of −83 mV. This electrode was left standing on open circuit in 30% aqueous KOH solution for 48 hours at room temperature and thereafter the activity was found to be −85 mV.

The same electrode was left standing on open circuit in 30% KOH solution for a further period of 24 hours at 70° C. The activity after this period was still −84 mV vs RHE.

The same electrode was then left standing in air for 20 hours. At the end of this period its electrode potential was still −85 mV vs RHE.

From these series of tests it is clear that there was no substantial loss of activity in spite of the severe conditions to which the electrode was subjected.

(c) A further electrode was prepared from a homogeneous solution of the type A but containing 40 atom % molybdenum. The electrode after thermal decomposition and curing in a hydrogen atmosphere at 500° C. had a catalyst loading of 78.7 mg/cm$^2$. The electrode had an initial electrode potential of −76 mV vs RHE. The electrode was then used as the cathode in a continuous electrolytic process lasting over 600 hours at 1 Amp/cm$^2$ and a temperature of 70° C. The electrode potential during all this time remained between −70 and −80 mV vs RHE.

It is clear from the above results that the new method of preparing these electrodes gives a more active and more stable electrode than produced hitherto and this degree of activity and stability is achieved without the aid of any supplementary additives to the electrolyte.

EXAMPLE 2

2.1 Preparation of the Homogeneous Solutions (a) Nickel-Vanadium (NiV)

1.0 g of ammonium vanadate (NH$_4$VO$_3$) and 3.22 g of nickel nitrate (Ni(NO$_3$)$_2$.6H$_2$O) were mixed with 30 ml of 20 percent w/v ammonia solution, the mixture was warmed and a further 10 ml of 35 percent w/v ammonia solution was added to effect dissolution of the reagents. 6 ml of this solution was mixed with 1.94 ml of a solution containing 5 ml of 3.4 molar nickel nitrate solution and 7 ml of 35 percent w/v ammonia solution. The homogeneous solution formed contained nickel and vanadium in the atom ratio 75:25 (based on elemental analysis).

(b) Iron-Molybdenum (FeMo)

6 ml of 1 molar ferric nitrate (Fe(NO$_3$)$_3$.9H$_2$O) solution was mixed with 4 ml of 1/7 molar ammonium molybdate ((NH$_4$)$_6$Mo$_7$O$_{24}$.4H$_2$O) solution and 2 ml of distilled water. The mixture was warmed at 70° C. until a gel formed. This gel contained iron and molybdenum in the atom ratio 54:46 (based on elemental analysis).

(c) Cobalt-Molybdenum (CoMo)

2 ml of 1/7 molar ammonium molybdate (NH$_4$)$_6$Mo$_7$O$_{24}$.4H$_2$O) solution was mixed with 4.8 ml of 35 percent w/v ammonia solution. 8 ml of 1 molar cobalt nitrate (Co(NO$_3$)$_2$.6H$_2$O) solution was added to this solution and the mixture shaken to effect dissolution of the reagents. The homogeneous solution formed contained cobalt and molybdenum in the approximate atom ratio 80:20 (based on weight of the reagents used).

(d) Manganese-Molybdenum (MnMo)

1 ml of 58% w/w manganous nitrate (Mn(NO$_3$)$_2$) solution was added to 1.67 g of ammonium molybdate ((NH$_4$)$_6$Mo$_7$O$_{24}$.4H$_2$O). 8 ml of distilled water was added to this mixture to form a homogeneous suspension containing manganese and molybdenum in the approximate atom ratio 80:20 (based on the weight of the reagents used).

(e) Nickel-Tungsten (NiW)

5 ml of a solution containing 1.29 g of anhydrous nickel chloride (NiCl$_2$) dissolved in 20 ml of dry methanol was mixed with 5 ml of a solution containing 1.453 g of tungsten hexachloride (WCl$_6$) dissolved in 20 ml of dry methanol. The resulting homogeneous solution contained nickel and tungsten in the approximate atom ratio 73:27 (based on the weight of the reagents used).

2.2 Preparation of the Electrodes

A weighed 80 mesh nickel screen (1×1 cm) was dipped into a homogeneous solution of the respective metal salts (specified in Example 2.1) and then heated in a bunsen flame to red heat and allowed to cool. The operation was repeated until the screen was covered with a resonable coating. The electrode was heated for 1 hour in a hydrogen atmosphere at either 400°, 500°, 600° or 700° C. The resulting electrode was re-weighed to determine its catalyst loading.

The NiW electrode was prepared in a similar manner to the above with the exception that a sintered nickel screen was used as the base for the catalyst coating.

The MnMo electrode was prepared in a similar manner to the above with the exception that after dipping into homogeneous solution, it was heated in air at 300° C. for 5 minutes and not in a bunsen flame to red heat.

2.3 Electrochemical Measurements

The measurements were performed in 30 percent w/v potassium hydroxide solution using a three compartment cell. The activity of the electrode was determined by measuring its potential against a reference electrode when a constant current of 1A was passed through the cell to give a current density of 1A/cm$^2$ of electrode. A saturated calomel electrode (SCE) was used as the reference electrode and a nickel screen as the counter electrode.

In order to determine the probable stability of the electrode to long term continuous electrolysis, the electrode was subjected to alternate periods of electrolysis and an open circuit, and the activity of the electrode determined after each period. After the period on open circuit, the solution was electrolysed for five minutes before the activity was measured.

All electrode potentials were IR corrected using the interrupter technique, and are quoted with respect to the reversible hydrogen electrode (RHE). All experiments were performed at 70° C. unless otherwise stated.

2.4 Results (a) Nickel-Vanadium

The optimum NiV electrode was prepared from a 75:25 homogeneous solution (as specified in Example 2.1) and was reduced at 400° C. for 1 hour. The measured activity of this electrode is recorded in Table 4.

(b) Iron-Molybdenum

The optimum FeMo electrode was prepared from a 54:46 homogeneous gel (as specified in Example 2.1) and was reduced at 600° C. for 1 hour. The measured activity of this electrode is recorded in Table 5.

(c) Cobalt-Molybdenum

The optimum CoMo electrode was prepared from a 80:20 homogeneous solution (as specified in Example 2.1) and was reduced at 400° C. for 1 hour. The measured activity of this electrode is recorded in Table 6.

(d) Manganese-Molybdenum

A MnMo electrode was prepared as in Example 2.2 from a 80:20 homogeneous suspension and was reduced at 500° C. for 1 hour. The measured activity of this electrode is recorded in Table 7.

(e) Nickel-Tungsten

A NiW electrode was prepared from a 73:27 homogeneous solution (as specified in Example 2.1) and was reduced at 500° C. for 2.5 hours. The measured activity of this electrode is recorded in Table 8.

EXAMPLE 3

Activity of NiMo Electrocatalysts Reduced under a Partial Pressure of Hydrogen NiMo catalysed electrodes were prepared from a homogeneous solution containing nickel and molybdenum in the atom ratio 60:40 (based on the weight of reagents used). The electrodes were prepared by the dip/pyrolysis procedure described in Example 2.2, and reduced under a partial pressure of hydrogen for 1 hour at 500° C. An electrode reduced under pure hydrogen for 1 hour at 500° C. was prepared as a standard. The activity of the electrodes was tested in a similar manner to that described in Example 2.3

3.1 Preparation of the Homogeneous Solution 2.96 g of nickel nitrate ($Ni(NO_3)_2.6H_2O$) and 1.17 g of ammonium molybdate (($NH_4)_6Mo_7O_{24}.4H_2O$) were dissolved in 10 ml of distilled water. 4.4 ml of 35 percent w/v ammonia solution was added to this solution. The resulting homogeneous solution contained nickel and molybdenum in the atom ratio 60:40 (based on weight of the reagents used).

3.2 Results

The activity of three electrodes reduced under pure hydrogen or a hydrogen/nitrogen atmosphere was checked. The reduction parameters are tabulated below:

Electrode 1

| Catalyst loading | 25 mg |
| --- | --- |
| Reduction time | 1 hour |
| Reduction temperature | 500° C. |
| Hydrogen flowrate | 2.283 cm$^3$/s |
| Nitrogen flowrate | 0.919 cm$^3$/s |
| Hydrogen partial pressure | 71% |

The activity of this electrode is recorded in Table 9.

Electrode 2

| Catalyst loading | 25 mg |
| --- | --- |
| Reduction time | 1 hour |
| Reduction temperature | 500° C. |
| Hydrogen flowrate | 0.817 cm$^3$/s |
| Nitrogen flowrate | 2.450 cm$^3$/s |
| Hydrogen partial pressure | 25% |

The activity of this electrode is recorded in Table 10.

Electrode 3

| Catalyst loading | 36 mg |
| --- | --- |
| Reduction time | 1 hour |
| Reduction temperature | 500° C. |
| Hydrogen flowrate | 3.45 cm$^3$/s |
| Nitrogen flowrate | 0.0 |
| Hydrogen partial pressure | 100% |

The activity of this electrode is recorded in Table 11, and is used as the standard for the experiment.

EXAMPLE 4

Activity of a NiMo Electrocatalyst During Long Term Electrolysis in a Brine/Caustic Environment The hydrogen activity of a NiMo electrode was monitored for 1000 hours in a brine/caustic environment. The electrode environment was designed to simulate the working environment of cathodes currently in use in the chloro/alkali industry.

4.1 Electrode Preparation

The NiMo electrode was prepared on a 1×1 cm 30 mesh nickel screen using the homogeneous solution specified in Example 3.1 and the technique specified in Example 2.2.

4.2 Electrochemical Measurements

The electrochemical measurements were performed using a three compartment cell with circulating electrolyte. The input feed to the cell contained 12 percent w/v sodium chloride and 10 percent w/v sodium hydroxide solution, and the flow adjusted to maintain the sodium hydroxide content of the catholyte at 15 percent w/v. 20 percent w/v sodium hydroxide solution was used as the anolyte, which was separated from the catholyte by a Nafion* cation exchange membrane. The anode used had an active coating so that a reasonable total cell voltage was achieved.

*(regd. Trade Mark)

A constant current of 300 mA was passed through the cell, and the experiment was conducted at 70° C. The activity of the cathode was measured versus a saturated calomel electrode (SCE). All electrode potentials were IR corrected using the interrupter technique, and are quoted with respect to the reversible hydrogen electrode (RHE).

4.3 Results

The results suggest that after the initial loss, the electrode activity remains stable at 100±10 mV vs RHE for greater than 1000 hours in a brine/caustic environment. The electrode can therefore be considered active and stable in the caustic/brine environment (see FIG. 2).

EXAMPLE 5

Activity of NiMo Electrocatalysts Prepared by Melt Spraying a Mixture of Powdered Nickel and Molybdenum Oxides Electrocatalysts were prepared by flame or plasma spraying a mixture of nickel oxide (NiO) and molybdenum trioxide ($MoO_3$) onto a grit-blasted mild steel substrate. After spraying the electrodes were reduced for 1 hour in an atmosphere of hydrogen at 500° C. The activity of the electrodes were determined in the usual manner, and the performance of flame sprayed electrodes compared with that of plasma sprayed electrodes.

5.1 Preparation of Electrodes (a) Flame Spray.

A mixture of nickel oxide (NiO) and molybdenum trioxide ($MoO_3$) (having a nickel to molybdenum atom ratio of 50:50 based on the weight of the reagents used) of about 50 micron particle size was sprayed onto a grit-blasted mild steel plate in an oxy-acetylene flame. The substrate was coated on one side only.

The coated substrate was divided into electrodes with a geometric coated surface area of 2 $cm^2$.

The electrodes were reduced in a hydrogen atmosphere for 1 hour at 500° C. Area of uncoated substrate were masked with PTFE.

(b) Plasma Spray

A mixture of nickel oxide (NiO) and molybdenum trioxide ($MoO_3$) (having a nickel to molybdenum atom ratio of 60:40, based on the weight of the reagents used) of about about 50 micron particle size was plasma sprayed onto a grit-blasted mild steel plate. The substrate was coated on one side only.

The coated substrate was divided into electrodes with a geometric coated surface area of 2 $cm^2$. The electrodes were reduced in a hydrogen atmosphere for 1 hour at 500° C. Areas of uncoated substrate were masked with PTFE.

5.2 Electrochemical Measurements

The electrochemical measurements were performed in a similar manner to those described in Example 2.3. All electrode potentials were IR corrected using the interrupter technique, and are quoted with respect to the reversible hydrogen electrode (RHE). All experiments were performed at 70° C. unless otherwise stated.

5.3 Results (a) The activity of the flame sprayed electrode is shown in Table 12.

(b) The activity of the plasma sprayed electrode is shown in Table 13.

TABLE 4
ELECTRODE: NiV REDUCED AT 400° C.
CATALYST LOADING: 26 mg

| Operation | Potential vs RHE/(mV) |
|---|---|
| Electrolysis for 5 minutes | −114 |
| Further electrolysis for 1 hour | −119 |
| Further electrolysis for 4 hours | −122 |
| Open circuit at room temperature for 66 hours | −119 |
| Further electrolysis for 4 hours | −127 |
| Open circuit for 17 hours | −127 |
| Further electrolysis for 3 hours | −137 |

TABLE 5
ELECTRODE: FeMo REDUCED AT 600° C.
CATALYST LOADING: 17 mg

| Operation | Potential vs RHE/(mV) |
|---|---|
| Electrolysis for 5 minutes | −175 |
| Further electrolysis for 1.5 hours | −181 |
| Open circuit for 17 hours | −174 |
| Further electrolysis for 2 hours | −193 |

TABLE 6
ELECTRODE: CoMo REDUCED AT 400° C.
CATALYST LOADING: 24.5 mg

| Operation | Potential vs RHE/(mV) |
|---|---|
| Electrolysis for 5 minutes | −99 |
| Further electrolysis for 6.5 hours | −122 |
| Open circuit for 17 hours | −135 |
| Further electrolysis for 7 hours | −159 |

TABLE 7
ELECTRODE: MnMo REDUCED AT 500° C.
CATALYST LOADING: 76 mg

| Operation | Potential vs RHE/(mV) |
|---|---|
| Electrolysis for 5 minutes | −245 |
| Further electrolysis for 30 minutes | −183 |
| Further electrolysis for 18 hours | −195 |
| Open circuit for 8 hours | −210 |

TABLE 8
ELECTRODE: NiW REDUCED AT 500° C.
CATALYST LOADING: 15.2 mg

| Operation | Potential vs RHE/(mV) |
|---|---|
| Electrolysis for 5 minutes | −121 |
| Further electrolysis for 3 hours | −134 |
| Open circuit for 19 hours | −134 |

TABLE 9
ELECTRODE: NiMo REDUCED UNDER 71% $H_2$ atm
CATALYST LOADING: 25 mg

| Operation | Potential vs RHE/(mV) |
|---|---|
| Electrolysis for 5 minutes | −99 |
| Further electrolysis for 24 hours | −102 |
| Further electrolysis for 24 hours | −98 |
| Open circuit for 17 hours | −108 |
| Further electrolysis for 7 hours | −109 |
| Open circuit for 17 hours | −114 |
| Further electrolysis for 7 hours | −121 |
| Open circuit at room temperature for 66 hours | −124 |
| Further electrolysis for 6 hours | −136 |

TABLE 10
ELECTRODE: NiMo REDUCED UNDER 25% $H_2$ atm
CATALYST LOADING: 25 mg

| Operation | Potential vs RHE/(mV) |
|---|---|
| Electrolysis for 5 minutes | −91 |
| Further electrolysis for 6 hours | −93 |
| Further electrolysis for 24 hours | −95 |
| Open circuit for 17 hours | −105 |
| Further electrolysis for 7 hours | −108 |
| Open circuit for 17 hours | −110 |
| Further electrolysis for 7 hours | −112 |
| Open circuit at room temperature for 66 hours | −123 |
| Further electrolysis for 6 hours | −129 |
| Open circuit for 18 hours | −141 |

TABLE 11

ELECTRODE: NiMo REDUCED UNDER 100% $H_2$ atm
CATALYST LOADING: 36 mg

| Operation | Potential vs RHE/(mV) |
| --- | --- |
| Electrolysis for 5 minutes | −94 |
| Further electrolysis for 25 hours | −105 |
| Further electrolysis for 24 hours | −106 |
| Further electrolysis for 24 hours | −103 |
| Open circuit at room temperature for 3 days | −121 |
| Further electrolysis for 4 hours | −123 |
| Open circuit at room temperature for 9 days | −124 |

TABLE 12

ELECTRODE: NiMo* FLAME SPRAYED

| Operation | Potential vs RHE/(mV) |
| --- | --- |
| Electrolysis for 20 minutes | −78 |
| Further electrolysis for 22 hours | −91 |
| Further electrolysis for 31 hours | −95 |
| Open circuit for 17 hours | −110 |
| Further electrolysis for 7 hours | −110 |
| Open circuit for 17 hours | −116 |
| Further electrolysis for 7 hours | −118 |
| Open circuit at room temperature for 66 hours | −143 |

*Catalyst loading was not determined because of the method of coating used; the coating thickness on the electrode was less than 25 Thou.

TABLE 13

ELECTRODE: NiMO* PLASMA SPRAYED

| Operation | Potential vs RHE/(mV) |
| --- | --- |
| Electrolysis for 5 minutes | −136 |
| Further electrolysis for 40 minutes | −104 |
| Further electrolysis for 6 hours | −125 |
| Open circuit at room temperature for 68 hours | −164 |
| Further electrolysis for 3 hours | −167 |

*Catalyst loading was not determined because of the method of coating used; the coating thickness on the electrode was less than 25 Thou.

We claim:

1. A method of producing metal electrodes comprising treating a metal electrode substrate so as to coat the substrate surface with a homogeneous solution of the compounds of (i) at least one metal selected from a first group of iron, cobalt, nickel and manganese (ii) at least one other metal selected from a second group of molybdenum, tungsten and vanadium, each of which compound, when not an oxide, is capable of thermal decomposition to the corresponding metal oxide, thermally decomposing the metal compounds, other than the oxides, on the substrate to the corresponding oxides or mixed oxides and curing the oxide-coated substrate in a reducing atmosphere at elevated temperature so as to convert at least some of the oxides to a metallic state.

2. A method of producing metal electrodes according to claim 1 comprising treating a metal electrode substrate so as to coat the substrate surface with a homogeneous solution of a nickel compound and a molybdenum compound both of which are capable of thermal decomposition to the corresponding oxides, thermally decomposing the metal compounds on the substrates surface to the corresponding oxides or mixed oxides, and subsequently curing the oxide-coated substrate in a reducing atmosphere at elevated temperature.

3. A process according to claim 1 wherein the metal electrode substrate on which the coating is carried out is selected from nickel, iron, copper, titanium, and alloys thereof, and other metallic substances plated therewith.

4. A method according to claim 1 wherein the homogeneous solution of the metal compounds is a liquid and comprises a solution of the metal compounds in an aqueous solvent.

5. A method according to claim 4 wherein ammonia is added to the aqueous solution to maintain the homogeneity of the solution.

6. A method according to claim 1 wherein the homogeneous solution is applied to the substrate surface by dipping, spraying, brushing or by plating.

7. A method according to claim 1 wherein the coated substrate surface is heated to a temperature between 250° and 1200° C. to decompose the metal compounds to the corresponding oxides.

8. A method according to claim 1 wherein the homogeneous solution of the metal compound comprises an intimate mixture of the respective solid metal compounds in their finely divided state or a solid solution thereof.

9. A method according to claim 8 wherein each of the metal compounds are the respective metal oxides.

10. A method according to claim 1 wherein the homogenous solution is applied to the substrate surface by a melt spraying technique which is selected from the group consisting of flame spraying and plasma spraying.

11. A method according to claim 1 wherein the substrate surface coated with the metal oxide is cured by heating in an atmosphere of hydrogen at a temperature between 250° and 700° C.

* * * * *